United States Patent
Reis

(10) Patent No.: US 8,511,819 B2
(45) Date of Patent: Aug. 20, 2013

(54) PREVENTION OF MYOPIA ACQUISITION IN CHILDREN AND YOUNG ADULTS USING READING GLASSES

(76) Inventor: Alexander Franz Peter Reis, Triesen (LI)

( * ) Notice: Subject to any disclaimer, the term of this patent is extended or adjusted under 35 U.S.C. 154(b) by 1923 days.

(21) Appl. No.: 11/637,570

(22) Filed: Dec. 12, 2006

(65) Prior Publication Data

US 2012/0236256 A1    Sep. 20, 2012

(51) Int. Cl.
*G02C 7/02* (2006.01)
*A61B 3/00* (2006.01)

(52) U.S. Cl.
USPC ............ 351/159.79; 351/159.73; 351/203

(58) Field of Classification Search
USPC ........... 351/159.73–159.75, 159.79, 159.01
See application file for complete search history.

(56) References Cited

U.S. PATENT DOCUMENTS

| | | | | |
|---|---|---|---|---|
| 6,325,508 B1 * | 12/2001 | Decreton et al. | ......... | 351/159.03 |
| 6,347,869 B1 * | 2/2002 | Xu et al. | ......... | 351/159.58 |
| 7,665,842 B2 * | 2/2010 | Ho et al. | ......... | 351/159.79 |
| 7,726,812 B2 * | 6/2010 | Dai et al. | ......... | 351/203 |
| 2009/0141235 A1 * | 6/2009 | Collins et al. | ......... | 351/160 R |

FOREIGN PATENT DOCUMENTS

| | | | |
|---|---|---|---|
| CN | 1648720 A | * | 8/2005 |
| WO | WO 2005/063153 | * | 7/2005 |

* cited by examiner

*Primary Examiner* — Jordan Schwartz

(74) *Attorney, Agent, or Firm* — Furr Law Firm; Jeffrey M. Furr, Esq.

(57) ABSTRACT

The present invention provides a new method and system for preventing myopia acquisition in children and young adults. There is strong evidence that near work might lead to myopia. The axial length of a human eye is growing in the first 25 years of life. There is experimental evidence for feed-back loops to control this growth. Prolonged near-work might interfere with these feed-back loops in a way that the axial length growth accelerates to provide perfect near vision—myopia. Using reading glasses in normal-sighted children and young adults prevents interference of prolonged near-work with axial length growth, hence preventing environmentally driven myopia acquisition.

2 Claims, No Drawings

PREVENTION OF MYOPIA ACQUISITION IN CHILDREN AND YOUNG ADULTS USING READING GLASSES

BACKGROUND OF THE INVENTION

1. Field of the Invention

The present invention relates generally to methods and systems for the prevention of myopia acquisition in children and young adults. Myopia, also known as nearsightedness, is a visual defect in which distant objects appear blurred because their images are focused in front of the retina rather than on it causing a retinal blur. Myopia is one of the more prevalent human visual disorders, affecting up to 50% of adults in Western countries in even more in Asia, with associated cost of correction and management having been estimated at several billion dollars per year. In some regions of the world, up to 75% of people may have myopia. Moreover, the prevalence of myopia is even increasing. In some instances, high levels of myopia may result in grave consequences, such as, blindness from retinal detachment, myopic macular degeneration, cataract, glaucoma, or severe side effects or complications from myopia correction. Thus, treatments which inhibit myopia would have a widespread benefit. It is believed that myopia may be caused by environmental factors, particularly intensive and excessive near work, with hereditary/genetic factors further defining susceptibility. Numerous animal studies have demonstrated that prolonged hyperopic defocus triggers an increase in eye growth, typically along an axial length of the eye, which can cause myopic change. Prolonged hyperopic defocus may be caused by naturally occurring refractive errors. Both accommodation deficiencies and life styles or occupations involving intensive near work result in frequent exposure to hyperopic defocus which in turn induces myopia. A number of techniques have been developed over the years to control or prevent myopia progression. These techniques include rigid contact lenses, spectacles, pharmacological delivery of atropine, biofeedback, vision training, and intentional undercorrection. Surgical correction of myopia includes refractive surgery, including myopic keratomileusis, radial keratotomy, and photorefractive keratotomy. While all these techniques have enjoyed varying levels of success, no one of these procedures provides a significant myopia prevention in all cases. Several studies have proven the use of bifocal spectacles or glasses to reduce the rate of myopia progression in children. In light of the above, it would be desirable to provide improved methods and systems for the prevention of myopia acquisition. It would be further desirable if such treatment methods would be safe, inexpensive and effective.

2. Description of Background Art

A significant correlation between nearwork and myopia has been found by Saw et al. (Lancet. 2001 Feb. 3; 357(9253): 390). Schaeffel has found experimentally that axial lengh growth might be influenced with glasses (Ophthalmologe. 2002 February; 99(2): 120-39). Leung and Brown have found that wearing progressive lenses slowed progression of myopia (Optom-Vis-Sci. 1999 June; 76(6): 346-54).

BRIEF SUMMARY OF THE INVENTION

The present invention provides new methods and systems for preventing myopia acquisition in children and young adults. In particular, the myopigenic effects of prolonged near work are addressed by these methods. The present invention provides a significant level of success in preventing myopia acquisition in children and young adults through the prescription of reading glasses.

DETAILED DESCRIPTION OF THE INVENTION

The present invention provides new methods and systems for preventing myopia acquisition in children and young adults. The use of reading glasses in preventing myopia acquisition is particularly advantageous as it is an effective, safe and inexpensive way to reduce the incidence of myopia in epidemiologic dimensions. The present invention provides a desired level of success in preventing myopia acquisition in children and young adults through the prescription of reading glasses. The lens power of the reading glasses is preferably +2.0 dioptres. In particular the reading glasses lens power prescription reduces myopia acquisition to preferably less than −0.2 D per year (in a matched control group myopia acquisition is −0.4 dioptres per year). The rate of myopia acquisition may be reduced by up to 90% with the reading glasses prescription. The reading glasses prescription may in certain circumstances inhibit or even reverse myopia progression. For effectively preventing myopia acquisition, the prescribed reading glasses should be used by the children and young adults during near-distance work (i.e. reading, writing, computer work, computer games). There is a significant positive correlation between the time of wearing the glasses and the preventive effect. Ocular growth associated with myopia progression may be reduced with the reading glasses prescription. Hence, the myopigenic effects of intensive near work may be altered by the use of reading glasses. In the following prospective, randomised clinical trial (SMART—Study of Myopia Acquisition in a randomised clinical Trial) the feasibility, safety and efficacy in preventing myopia acquisition in children has been investigated.

Purpose

This study was conducted to test the feasibility, safety and effectiveness of the use of reading glasses during near-work in preventing myopia acquisition in children and young adults.

Method

This prospective clinical trial included 110 children (aged 7 to 10 years). The children have been randomly assigned into two groups: group 1 (control), group 2 (reading glasses). All children had a complete ophthalmologic and biometric control at the beginning of the trial.

Patient Selection

Only children, who were emmetropic or physiologically hyperopic (i.e. hyperopic with an uncorrected visual acuity of 1.0 and no astenopic complaints) were included in the trial. A comprehensive eye examination was performed after one year, in particular: history and review of reading habits, cycloplegic auto refraction, monocular subjective refraction, keratometry, anterior chamber depth, axial length, and biomicroscopy. Children meeting the study criteria who were randomly assigned into group two were fitted with reading glasses. The lens power of the reading glasses was +2.0 dioptres. The Children were asked to wear the reading glasses during prolonged near work (i.e. homework, computer games, computer work).

Results

A myopic shift was found on average about −0.4 dioptres per year in the control group (no intervention). Children in group two who wore the reading glasses showed a statistically significant reduction of this myopic shift to about −0.2 dioptres per year (p<0.05). A significant correlation has been found between the time of wearing the glasses and the anti-myopic effect (p<0.05). Five children in group one and two children in group two progressed to myopia within this one-year follow up (cycloplegic refraction<0.00 dioptres).

CONCLUSIONS

Using reading glasses during prolonged near work was effective in limiting the rate of myopic shift to a statistically significant level in this series of emmetropic and physiologically hyperopic (i.e. normal sighted) children. Additionally, a significant correlation has been found between the anti-myopic effect and the time of wearing the reading glasses. Although certain preferred embodiments and methods have been disclosed herein, it will be apparent from the foregoing disclosure to those skilled in the art that variations and modifications of such embodiments and methods may be made without departing from the true spirit and scope of the invention. Therefore, the above description should not be taken as limiting the scope of the invention which is defined by the appended claims.

What is claimed is:

1. A method for preventing myopia acquisition, the method comprising: prescribing reading glasses to either only children and young adults that are either only emmetropic or hyperopic, said reading glasses being worn for prolonged periods of near work time, wherein the lens power prescription inhibits myopia acquisition where said prescription is in a single constant reading prescription of approximately plus 2.0 dioptres and said reading glasses provide no other optical correction.

2. A method for preventing myopia acquisition, the method comprising: prescribing reading glasses to either only children and young adults that are either only emmetropic or hyperopic, said reading glasses being worn for prolonged periods of near work time, wherein the lens power prescription prevents myopia acquisition for late onset myopia where said prescription is in a single constant reading prescription of approximately plus 2.0 dioptres and said reading glasses provide no other optical correction.

* * * * *